United States Patent
Hiramatsu

(10) Patent No.: US 12,549,036 B2
(45) Date of Patent: Feb. 10, 2026

(54) POWER TRANSMISSION DEVICE, POWER TRANSMISSION METHOD OF POWER TRANSMISSION DEVICE, AND NON-TRANSITORY RECORDING MEDIUM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/333,389

(22) Filed: Jun. 12, 2023

(65) Prior Publication Data
US 2023/0402880 A1    Dec. 14, 2023

(30) Foreign Application Priority Data
Jun. 13, 2022  (JP) .................................. 2022-095053

(51) Int. Cl.
| | | |
|---|---|---|
| H02J 50/60 | (2016.01) |
| B60L 53/124 | (2019.01) |
| H02J 50/10 | (2016.01) |
| H02J 50/40 | (2016.01) |
| H02J 50/80 | (2016.01) |

(52) U.S. Cl.
CPC .......... H02J 50/402 (2020.01); B60L 53/124 (2019.02); H02J 50/10 (2016.02); H02J 50/60 (2016.02); H02J 50/80 (2016.02)

(58) Field of Classification Search
CPC .......... H02J 50/402; H02J 50/10; H02J 50/60; H02J 50/80; B60L 53/124
See application file for complete search history.

(56) References Cited

U.S. PATENT DOCUMENTS

| | | | |
|---|---|---|---|
| 10,199,866 B2 | 2/2019 | Uchimoto et al. | |
| 10,897,148 B2 | 1/2021 | Graham et al. | |
| 2020/0343772 A1 | 10/2020 | Mashimo | |
| 2021/0203193 A1* | 7/2021 | Kim | H02J 50/80 |
| 2021/0320528 A1* | 10/2021 | Kim | B60R 16/03 |
| 2023/0402880 A1* | 12/2023 | Hiramatsu | H02J 50/60 |

FOREIGN PATENT DOCUMENTS

| | | |
|---|---|---|
| EP | 3961858 A1 | 3/2022 |
| JP | 2015056959 A | 3/2015 |
| JP | 2018186699 A | 11/2018 |
| JP | 2020182294 A | 11/2020 |
| JP | 2022077660 A | 5/2022 |
| WO | 2021261053 A1 | 12/2021 |
| WO | 2022102497 A1 | 5/2022 |
| WO | 2022102500 A1 | 5/2022 |

* cited by examiner

Primary Examiner — Daniel Cavallari
(74) Attorney, Agent, or Firm — Canon U.S.A., Inc. IP Division

(57) ABSTRACT

Provided is a power transmission device including: a plurality of power transmission coils; a power transmission unit configured to wirelessly transmit power to a power receiving device using at least one of the plurality of power transmission coils; a detection unit configured to perform a process of detecting an object using at least one of the plurality of power transmission coils; and a reception unit configured to receive a signal from the power receiving device, wherein, in a case where the reception unit receives a request to stop power transmission from the power receiving device, the detection unit performs, in a period of stop of a power transmission, a process of detecting an object using a power transmission coil which was used for the power transmission.

17 Claims, 9 Drawing Sheets

POWER TRANSMISSION DEVICE, POWER TRANSMISSION METHOD OF POWER TRANSMISSION DEVICE, AND NON-TRANSITORY RECORDING MEDIUM

BACKGROUND

Field

The present disclosure relates to techniques related to wireless power transmission.

Description of the Related Art

The standardization organization Wireless Power Consortium has established a wireless charging standard (hereinafter referred to as "WPC standard") that is widely known. Japanese Patent Laid-Open No. 2015-56959 discloses a power transmission device and a power receiving device compliant with the WPC standard. According to the WPC standard, power transmission and reception and control communication therefor are performed using magnetic induction.

A near field communication (NFC) scheme is a type of wireless communication scheme. An NFC tag does not have a battery; rather it is driven using energy of electromagnetic waves transmitted from a communication partner during communication. If wireless power transmission in accordance with the WPC standard is performed on the NFC tag, the antenna element and the like of the NFC tag may be damaged. In order to avoid such a situation, the WPC standard provides a power transmission and reception stop period between a power transmission device and a power receiving device when power transmission and reception are started. During the power transmission and reception stop period, the power receiving device detects the NFC tag through communication based on the standard related to NFC (NFC standard). Depending on the detection result of the NFC tag, it is determined whether to stop or restart power transmission and reception after the end of the power transmission and reception stop period.

In addition, Japanese Patent Laid-Open No. 2018-186699 discloses a wireless charging mat that includes a plurality of power transmission coils and is capable of efficiently charging electronic devices over most of the charging surface.

In a system using the WPC standard, since the power transmission device does not perform any communication during the power transmission and reception stop period, it is not possible to detect the state of placement of the power receiving device on the power transmission device during. Therefore, even if the power receiving device is removed during the period, the power transmission device waits until the end of the power transmission and reception stop period.

SUMMARY

As a method of avoiding such above-described unnecessary time delay, a method of transmitting an analog ping in order to detect the state of placement of an object even during the power transmission and reception stop period of the power transmission device can be considered. However, an appropriate control method of transmitting an analog ping during a power transmission and reception stop period in a power transmission device provided with a plurality of power transmission coils has not been studied so far.

An object of the present disclosure is to provide a power transmission device that includes a plurality of power transmission coils for performing wireless power transmission and enables control to detect an object during a period of stop of wireless power transmission as requested by a power receiving device.

According to various embodiments of the present disclosure, there is provided a power transmission device including: a plurality of power transmission coils; a power transmission unit configured to wirelessly transmit power to a power receiving device using at least one of the plurality of power transmission coils; a detection unit configured to perform a process of detecting an object using at least one of the plurality of power transmission coils; and a reception unit configured to receive a signal from the power receiving device, wherein, in a case where the reception unit receives a request to stop power transmission from the power receiving device, the detection unit performs, in a period of stop of a power transmission, a process of detecting an object using a power transmission coil which was used for the power transmission.

Further features of the present disclosure will become apparent from the following description of exemplary embodiments with reference to the attached drawings.

DESCRIPTION OF THE EMBODIMENTS

Figure 1:
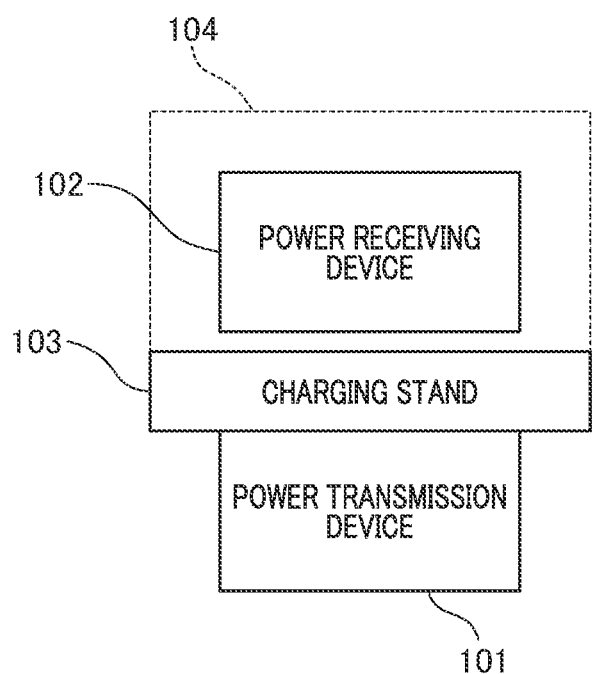
FIG. 1 is a diagram illustrating a configuration example of a non-contact charging system according to one embodiment.

Hereinafter, various embodiments of the present disclosure will be described in detail with reference to the accompanying drawings. Note, however, that, not all of a plurality of features in the embodiments of the present disclosure are essential to the invention, and the plurality of features may be combined in other ways. In the drawings, the same or similar components are denoted by the same reference numerals and signs in different Figures, so as to avoid having to repeat description unecessarily. Various embodiments show an example of a system compliant with the WPC standard.

FIG. 1 shows a configuration of a non-contact charging system as an example of a wireless power transmission system according to one embodiment. This system is configured to include a power transmission device 101 and a power receiving device 102. Hereinafter, in order to simplify description, the power transmission device 101 may be referred to as TX, and the power receiving device 102 may be referred to as RX. The TX is an electronic instrument that wirelessly transmits power to the RX placed on a charging stand 103. The RX is an electronic instrument that receives power from the power transmission device 101 and charges its built-in battery. A range 104 framed by a dotted line indicates a range in which the RX can receive electric power transmitted from the TX.

The RX and TX can have a function of executing applications other than non-contact charging. For example, the RX is a smartphone and the TX is an accessory instrument for charging the battery of the smartphone.

In this system, wireless power transmission using an electromagnetic induction scheme for non-contact charging is performed on the basis of the WPC standard. The RX and TX perform wireless power transmission for non-contact charging between the power receiving coil of the RX and the power transmission coil of the TX. Meanwhile, the wireless power transmission scheme (non-contact power transmission scheme) is not limited to a scheme specified by the WPC standard, and other electromagnetic induction schemes, magnetic-field resonance schemes, electric-field resonance schemes, microwave schemes, lasers, and the like may be used. In addition, in the present embodiment, wireless power transmission is assumed to be used for non-contact charging, but wireless power transmission may be used for applications other than non-contact charging.

In the WPC standard, the magnitude of power guaranteed when the RX receives power from the TX is specified according to the value of guaranteed power (hereinafter referred to as "GP"). GP indicates, for example, a power value which is guaranteed to be output to a load of the RX such as a charging circuit even if the efficiency of power transmission between the power receiving coil and the power transmission coil decreases due to a fluctuation in the positional relationship between the RX and the TX. For example, the value of GP is set to 15 (watts). In this case, even if the efficiency of power transmission decreases due to a fluctuation in the positional relationship between the power receiving coil and the power transmission coil, the TX transmits power to the RX by performing control so that it can output 15 watts to the load in the RX.

In addition, the WPC standard specifies a method for the TX to detect the presence of an object which is not a power receiving device in the vicinity of the TX (around a power receiving antenna). Such an object may be referred to as a foreign object. More specifically, a first method is a foreign object detection method based on a change in the quality factor (Q value) of the power transmission antenna (power transmission coil) in the TX. A second method (power loss method) is a foreign object detection method based on a difference between transmitted power of the TX and received power of the RX. The first method is performed before power transmission (negotiation phase or renegotiation phase). In addition, the second method is performed during power transmission (power transfer phase) on the basis of data that has undergone a calibration process to be described later. The details of a foreign object detection process will be described later.

Incidentally, there may be essential metal components in a plurality of components constituting the RX (and products in which the RX is incorporated) or the TX (and products in which the TX is incorporated). There are metal components that may unintentionally generate heat if they are exposed to power transmitted wirelessly by the power transmission coil. Examples of such metal components include a metal frame around the power transmission coil or the power receiving coil. A foreign object in the present embodiment is an object other than the metal component among conductor components that may generate heat if they are exposed to power transmitted wirelessly by the power transmission coil. For example, a clip, an IC card, and the like are equivalent to the foreign object.

Examples of communication performed by the RX and TX include communication for power transmission and reception control based on the WPC standard and communication for instrument authentication. Here, the communication for power transmission and reception control based on the WPC standard will be described. The WPC standard specifies a plurality of phases including a power transfer phase in which power transmission is performed and a phase before actual power transmission is performed, and communication for necessary power transmission and reception control is performed in each phase. Various phases will be described below.

The phase before power transmission may include a ping phase, an identification and configuration phase, a negotiation phase, and a calibration phase. Meanwhile, hereinafter, the identification and configuration phase is referred to as an I&C phase. In the ping phase, the TX intermittently transmits analog pings to detect the presence of an object within a power transmittable range. For example, the TX can detect that the power receiving device 102, a conductor piece, or the like is placed on the charging stand 103. Thereafter, the TX transmits a digital ping with higher power than the analog ping. The magnitude of the digital ping is enough power to start up the control unit of the RX placed on the TX. The RX notifies the TX of the magnitude of the received voltage through a signal strength packet. In this manner, the TX recognizes that the object detected by the analog ping is the RX by receiving a response from the RX that has received the digital ping.

In a case where the TX receives a notification from the RX about the magnitude of the received voltage, it transitions to the I&C phase. In addition, the TX measures the quality factor (Q-factor) of the power transmission antenna (power transmission coil) before the transmission of the digital ping. The result of this measurement is used to execute the foreign object detection process using a Q value measurement method. In the I&C phase, the TX identifies the RX and acquires instrument configuration information (capability information) from the RX. Therefore, the RX transmits an ID packet and a configuration packet to the TX. The ID packet contains identification information of the RX, and the configuration packet contains instrument configuration information (capability information) of the RX. The TX that has received the ID packet and configuration packet responds with an acknowledgement (hereinafter referred to as ACK). Then, the I&C phase ends.

In the negotiation phase, a guaranteed power (GP) value is determined on the basis of power requested by the RX, power transmission capability of the TX, or the like. The GP value indicates, for example, a power value at which output to the load of the power receiving device (such as, for example, a charging circuit or a battery) is guaranteed even if the efficiency of power transmission between the power receiving antenna and the power transmission antenna decreases due to a fluctuation in the positional relationship between the power receiving device and the power transmission device. For example, if the GP is 5 watts, the power transmission device transmits power by performing control so that it can output 5 watts to the load in the power receiving device even if the efficiency of power transmission decreases due to a fluctuation in the positional relationship between the power receiving antenna and the power transmission antenna. The GP value is a power value agreed upon by the RX and TX. In addition, the TX executes the foreign object detection process using a Q value measurement method in accordance with a request from the RX. The WPC standard specifies a method of once transitioning to the power transfer phase and then performing the same process as in the negotiation phase again upon the request from the RX. The phase in which these processes are performed after transitioning from the power transfer phase is referred to as a renegotiation phase.

In the calibration phase, the RX notifies the TX of a predetermined received power value on the basis of the WPC standard, and the TX makes adjustments for transmitting power efficiently. The predetermined received power value is, for example, a received power value in a light load state or a received power value in a maximum load state. The TX can use the received power value notified of by the RX for the foreign object detection process using the power loss method.

In the power transfer phase, control for continuation of power transmission, error processing, power transmission stop due to full charge, and the like are performed. The TX and RX perform communication for power transmission and reception control through in-band communication in which signals are superimposed using the same antenna (coil) as wireless power transmission on the basis of the WPC standard. Meanwhile, the range in which in-band communication based on the WPC standard is possible between the TX and RX substantially matches the power transmittable range. The range 104 shown in FIG. 1 represents a range in which wireless power transmission and in-band communication can be performed by the power transmission antenna of the TX and the power receiving antenna of the RX. Meanwhile, in the following description, the RX being "placed" on the TX means that the RX has entered the range 104, and is also assumed to include a state where the RX is not actually placed on the charging stand 103.

Figure 2:
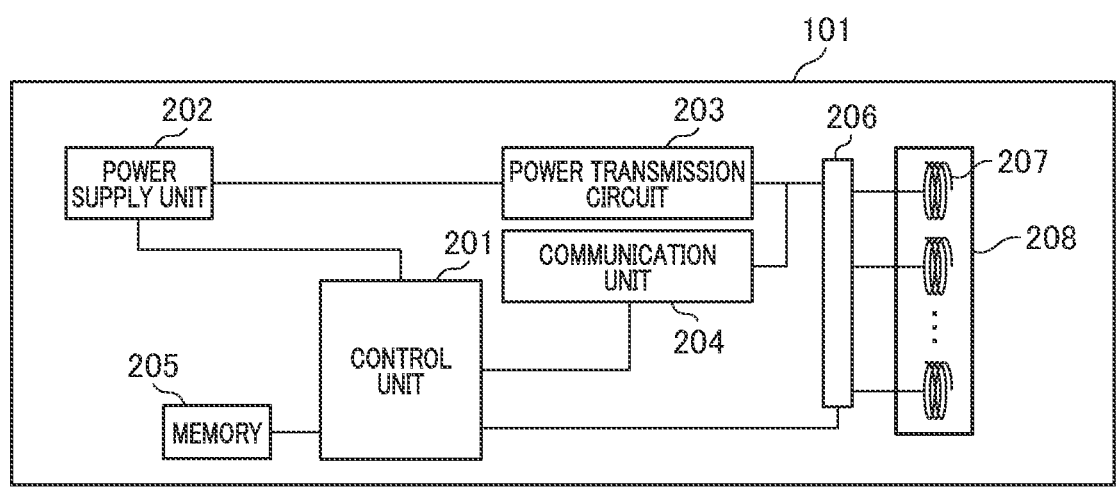
FIG. 2 is a block diagram illustrating a configuration example of a power transmission device according to one embodiment.

Next, the configurations of the power transmission device 101 (TX) and the power receiving device 102 (RX) will be described with reference to FIGS. 2 and 3. FIG. 2 is a diagram illustrating a configuration example of the TX. The TX includes a control unit 201, a power supply unit 202, a power transmission circuit 203, a communication unit 204, a memory 205, a selection unit 206, and a power transmission coil 207. A power transmission coil group 208 is composed of a plurality of power transmission coils 207.

The control unit 201 controls the entire TX and is configured to include one or more processors such as a central processing unit (CPU) or a micro processing unit (MPU). Alternatively, the control unit 201 may include an application specific integrated circuit (ASIC), a field programmable gate array (FPGA), or the like configured to execute processing to be described later.

The power supply unit 202 has a power supply that supplies power when at least the control unit 201 and the power transmission circuit 203 operate. The power supply unit 202 includes, for example, a wired power receiving circuit that receives power supply from a commercial power supply, a battery, or the like.

The power transmission circuit 203 generates an alternating-current voltage and alternating current for any of the power transmission coils 207 in the power transmission coil group 208. The power transmission circuit 203 converts, for example, a direct-current voltage supplied by the power supply unit 202 into an alternating-current voltage using a switching circuit of a half-bridge configuration or a full-bridge configuration using an electric field effect transistor (FET). In this case, the power transmission circuit 203 includes a gate driver that controls ON/OFF of the FET.

The communication unit 204 performs control communication for wireless power transmission based on the WPC standard with a communication unit (a first communication unit 304 in FIG. 3) of the power receiving device 102. The in-band communication executed by the communication unit 204 is communication in which the alternating-current voltage or current generated by the power transmission circuit 203 is modulated and a signal of communication target data is superimposed on wireless power. The memory 205 connected to the control unit 201 stores data and the like relating to each element and the overall state of the power transmission device 101 and the wireless power transmission system.

Any one or a plurality of power transmission coils among the plurality of power transmission coils 207 constituting the power transmission coil group 208 are connected to the power transmission circuit 203. The selection unit 206 connects any one or the plurality of power transmission coils 207 in the power transmission coil group 208 to the power transmission circuit 203. Control for switching the selection unit 206 is performed according to a control command from the control unit 201 to the selection unit 206, and thus it is determined which of the power transmission coils the power transmission circuit 203 is connected to.

Figure 3:
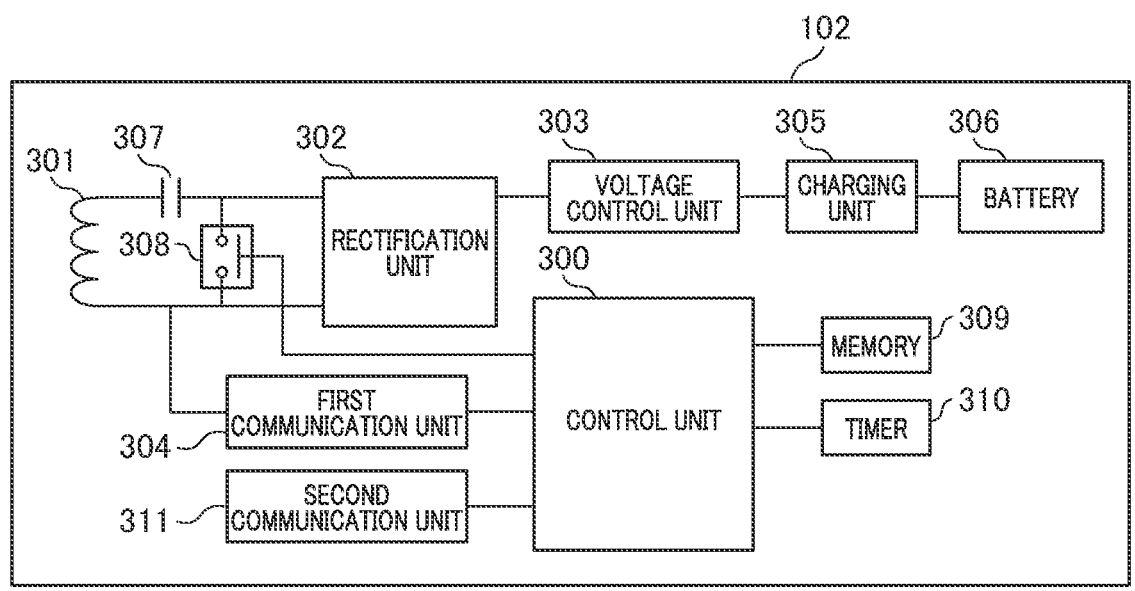
FIG. 3 is a block diagram illustrating a configuration example of a power receiving device according to one embodiment.

FIG. 3 is a diagram illustrating a configuration example of the RX. The RX includes a control unit 300, a power receiving coil 301, a rectification unit 302, a voltage control unit 303, and the first communication unit 304. The RX further incudes a charging unit 305, a battery 306, a resonance capacitor 307, a switch unit 308, a memory 309, a timer 310, and a second communication unit 311.

The control unit 300 controls the entire RX, for example, by executing a control program stored in the memory 309. The control unit 300 can perform control for executing applications other than wireless power transmission. For example, the control unit 300 is configured to include one or more processors such as a CPU or an MPU. Alternatively, the control unit 300 may be configured to include hardware dedicated to specific processing such as an ASIC or an array circuit such as an FPGA. The control unit 300 causes the memory 309 to store information to be stored during execution of various processes. In addition, the control unit 300 can execute a process of measuring time using the timer 310.

The power receiving coil 301 receives power from the power transmission coil of the TX. In addition, the power receiving coil 301 is connected to the resonance capacitor 307 and resonates at a specific frequency F2. The rectification unit 302 converts the alternating-current voltage and alternating current from the power transmission coil received through the power receiving coil 301 into a direct-current voltage and direct current. The voltage control unit 303 converts the level of the direct-current voltage input from the rectification unit 302 to a predetermined level. The predetermined level is a level of a direct-current voltage at which the control unit 300, the charging unit 305, and the like can operate.

The first communication unit 304 performs control communication based on the WPC standard with the TX through in-band communication. The first communication unit 304 demodulates electromagnetic waves input from the power receiving coil 301 to acquire information transmitted from the TX, and performs load modulation on the electromagnetic waves to superimpose a signal of information to be transmitted to the TX on the electromagnetic waves. The communication unit 204 of the TX can acquire a signal superimposed on a power transmission waveform caused by the power transmission coil 207.

The battery 306 supplies power required for control, power reception, and communication to the entire RX. In addition, the battery 306 stores the power received through the power receiving coil 301. The resonance capacitor 307 is connected to the power receiving coil 301. The switch unit 308 has a function of short-circuiting the power receiving coil 301 and the resonance capacitor 307, and ON/OFF is controlled by the control unit 300. In a case where the switch unit 308 is turned on, a serial resonance circuit is formed by the power receiving coil 301 and the resonance capacitor 307. In this case, a current flows only through the closed circuit of the power receiving coil 301, the resonance capacitor 307, and the switch unit 308, and no current flows through the rectification unit 302 and the voltage control unit 303. In addition, in a case where the switch unit 308 is turned off, a current flows through the power receiving coil 301 and the resonance capacitor 307 to the rectification unit 302 and the voltage control unit 303.

The memory 309 is connected to the control unit 300 and stores various types of information. The memory 309 can store information acquired by a functional unit different from the control unit 300. The timer 310 is connected to the control unit 300 and is used for various clocking processes. For example, the timer 310 has functions of a count-up timer that measures the elapsed time from the start-up time and a count-down timer that decreases the count value from a set time.

The second communication unit 311 communicates with other NFC instruments using an NFC function. The other NFC instruments are assumed to include NFC tags. The RX can detect the presence of the NFC tags through the second communication unit 311. The second communication unit 311 has an antenna (not shown) different from the power receiving coil 301. In addition, the second communication unit 311 is controlled by the control unit 300, but is not limited to this embodiment. The second communication unit 311 may be controlled by the control unit of another device (such as a camera, a smartphone, a tablet PC, or a laptop PC) (not shown) that has a built-in RX. The components shown in FIGS. 2 and 3 are examples, and some of the components may be replaced with other components that perform similar functions or may be omitted, and separate components may be added thereto. In addition, one block element may be divided into a plurality of block elements, or a plurality of block elements may be integrated into one block element.

FIG. 4 is a schematic diagram illustrating an arrangement example of the power transmission coil group 208. The arrangement of the power transmission coil group 208 of the present embodiment and the power transmission circuit that can be connected to each power transmission coil will be described on the premise of the arrangements shown in FIGS. 4A to 4E, but these are examples and are not limited to a specific arrangement example.

Figure 4A:
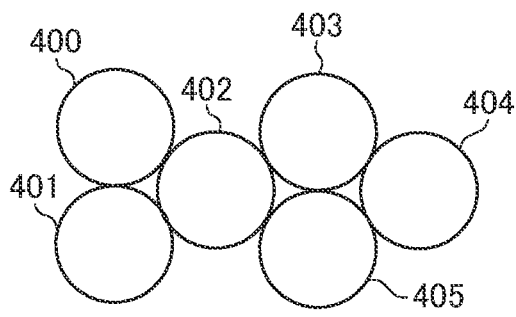
FIGS. 4A to 4E are diagrams illustrating an arrangement example of a power transmission coil group according to one embodiment.

FIG. 4A is a top view of a part of the power transmission coil group 208. Six circular coils of a power transmission coil 400 to a power transmission coil 405 are shown. The power transmission coil 400, the power transmission coil 401, and the power transmission coil 402 are arranged so that a part of their circumference is in contact with the other two power transmission coils. Similarly, the power transmission coil 403, the power transmission coil 404, and the power transmission coil 405 are arranged so that a part of their circumference is in contact with the other two coils. In addition, the power transmission coil 402, the power transmission coil 403, and the power transmission coil 405 are arranged so that a part of their circumference is in contact with the other two coils.

Figure 4B:
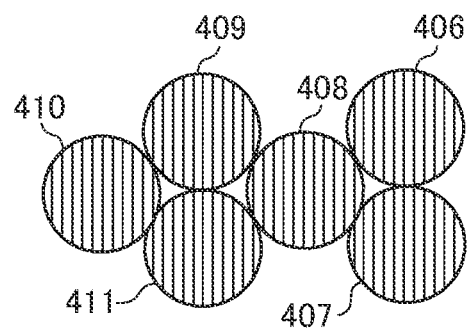

FIG. 4B shows six circular coils of a power transmission coil 406 to a power transmission coil 411, which are arranged opposite to the power transmission coil 400 to the power transmission coil 405 in FIG. 4A in the left-right direction. That is, the arrangement is the same as in a case where FIG. 4A is viewed from the back side. Meanwhile, for the power transmission coil group including the power transmission coil 406 to the power transmission coil 411, a plurality of vertical lines are added within the circle for convenience in order to distinguish between the power transmission coil 400 to the power transmission coil 405. The power transmission coil 409, the power transmission coil 410, and the power transmission coil 411 are arranged so that a part of their circumference is in contact with the other two coils. Similarly, the power transmission coil 406, the power transmission coil 407, and the power transmission coil 408 are arranged so that a part of their circumference is in contact with the other two coils. The power transmission coil 408, the power transmission coil 409, and the power transmission coil 411 are arranged so that a part of their circumference is in contact with the other two coils.

Figure 4C:
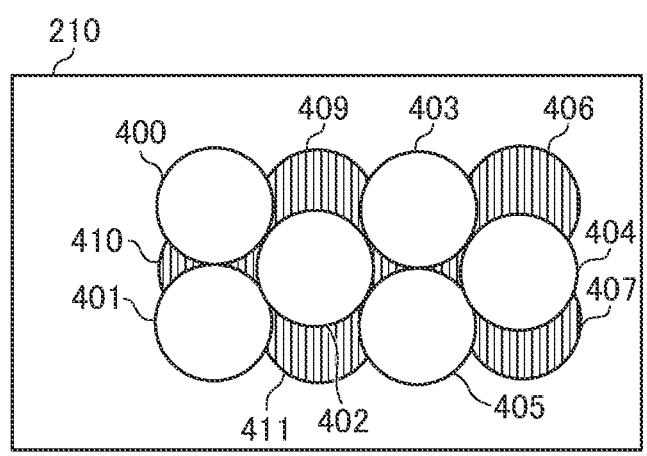

FIG. 4C is a top view of the entire power transmission coil group. In a power transmission coil group 210, the power transmission coil 400 to the power transmission coil 405 shown in FIG. 4A are arranged to overlap on the power transmission coil 406 to the power transmission coil 411 shown in FIG. 4B.

Figure 4D:
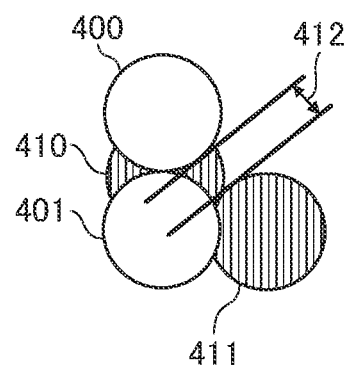

FIG. 4D is a diagram illustrating a positional relationship between the power transmission coils 400 and 401 and the power transmission coils 410 and 411. Since the power transmission coil 400 and the power transmission coil 410, and the power transmission coil 401 and the power transmission coil 410 overlap each other in top view, these coils are expressed as "overlapping." On the other hand, the power transmission coil 400 and the power transmission coil 411 do not overlap each other in top view. In addition, a distance 412 indicates a distance (denoted as D) between the outer shape of the power transmission coil 400 and the outer shape of the power transmission coil 411. That is, the power transmission coil 400 and the power transmission coil 411 are separated by a distance D.

Among a plurality of power transmission coils adjacent to each other, a first coil is denoted as a coil A, and a second coil is denoted as a coil B. Power transmitted by the coil A and a signal of in-band communication transmitted and received by the communication units of the power transmission device and the power receiving device may be superimposed on power transmitted by the coil B and a signal of in-band communication. This phenomenon is expressed as interference in the present disclosure. Interference and non-interference between a plurality of power transmission coils are defined as follows. If the coil A satisfies condition (1) or (2) with respect to the coil B, the two power transmission coils are expressed as "not interfering."

(1) Fluctuation in the voltage amplitude or current amplitude of a modulation signal transmitted and received by the coil A or fluctuation in frequency is not observed in the coil B.

(2) Fluctuation in the voltage amplitude or current amplitude of a modulation signal transmitted and received by the coil A or fluctuation in frequency is observed in the coil B, and the observation level is equal to less than a predetermined value (threshold) and does not influence demodulation performance when the communication unit demodulates a modulation signal of the coil B.

The definition of two power transmission coils "interfering" can be derived from the negative conditions for conditions (1) and (2). If condition (3) is satisfied, the two power transmission coils are expressed as "interfering."

(3) Fluctuation in the voltage amplitude or current amplitude of a modulation signal transmitted and received by the coil A or fluctuation in frequency is observed in the coil B, and the observation level is greater than a predetermined value (threshold) and influences demodulation performance when the communication unit demodulates the modulation signal of the coil B.

In addition, among electromagnetically coupled (that is, the coupling coefficient is not zero) power transmission coils, a first power transmission coil is denoted as a coil A, and a second power transmission coil is denoted as a coil B. If the coil A satisfies condition (4) or (5) with respect to the coil B, the two power transmission coils are expressed as "not interfering."

(4) A high-frequency voltage or high-frequency current applied to the coil A, its high-frequency voltage fluctuation or high-frequency current fluctuation, or a voltage due to fluctuation in frequency is not induced in the coil B.

(5) The voltage level induced in the coil B due to the high-frequency voltage or high-frequency current applied to the coil A, its high-frequency voltage fluctuation or high-frequency current fluctuation, or fluctuation in frequency is equal to or less than a predetermined value (threshold).

If condition (6) is satisfied, the two power transmission coils is expressed as "interfering."

(6) The voltage level induced in the coil B due to the high-frequency voltage or high-frequency current applied to the coil A, its high-frequency voltage fluctuation or high-frequency current fluctuation, or fluctuation in frequency is greater than a predetermined value (threshold).

If the two power transmission coils interfere, the degree of interference differs depending on a positional relationship between the two power transmission coils. In the present embodiment, it is assumed that the two power transmission coils do not interfere if they are separated by a predetermined distance D (see 412 in FIG. 4D) or more. For example, the power transmission coil 400 and the power transmission coil 411 do not interfere. In addition, the power transmission coil 400 and the power transmission coil 410, and the power transmission coil 401 and the power transmission coil 410 overlap each other, and neither of them is separated by the distance D or more. Thus, the power transmission coil 400 and the power transmission coil 410 interfere, and the power transmission coil 401 and the power transmission coil 410 interfere. Meanwhile, the predetermined value (threshold) and the distance D may be specified by the WPC standard.

Figure 4E:
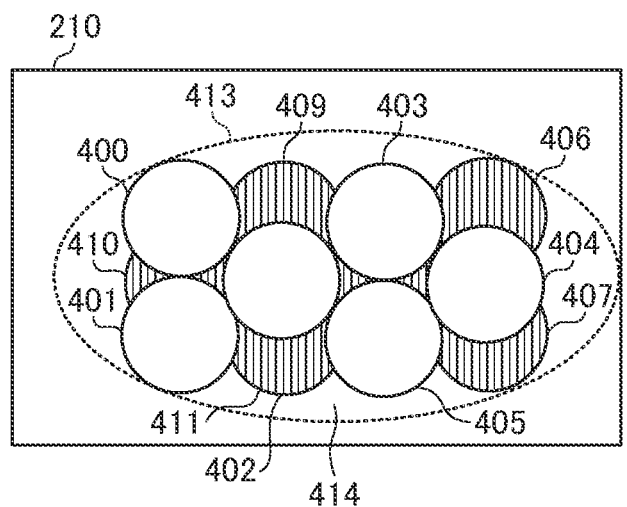

FIG. 4E is a conceptual diagram illustrating a power transmission coil group to which the power transmission circuit can supply power. The inside of dotted-line elliptical frame 413 indicates the range of power transmission coils to which the power transmission circuit 203 can be connected with the selection unit 206 interposed therebetween. The power transmission coils 400 to 411 of which the centers are included inside the dotted-line elliptical frame 413 can be connected to the power transmission circuit 203. In addition, a power receiving device placed in a predetermined region 414 can be charged through a power transmission coil connected to the power transmission circuit 203. Meanwhile, in the present embodiment, it is possible to transmit power to a maximum of one power receiving device in the predetermined region 414.

Figure 5:
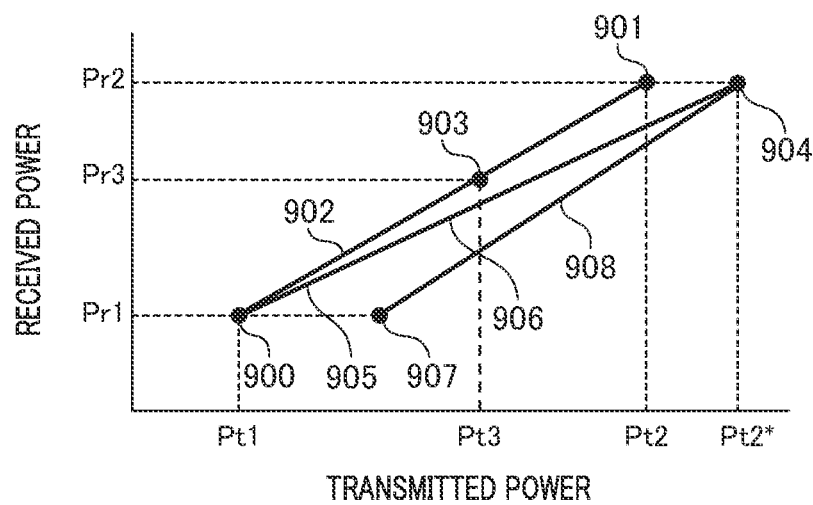
FIG. 5 is a diagram illustrating a process of detecting an object using a power loss method according to one embodiment.

Next, a foreign object detection method based on the power loss method specified by the WPC standard will be described with reference to FIG. 5. The horizontal axis in FIG. 5 represents transmitted power of the TX (power transmission device), and the vertical axis represents received power of the RX (power receiving device). Points 900, 901, and 903 are points on a line segment 902. The point 900 corresponds to a transmitted power value Pt1 and a received power value Pr1, and the point 901 corresponds to a transmitted power value Pt2 and a received power value Pr2. The point 903 corresponds to a transmitted power value Pt3 and a received power value Pr3. A line segment 906 is a line segment that connects the point 900 and a point 904. The point 904 corresponds to a transmitted power value Pt2* and the received power value Pr2. A line segment 908 is a line segment that connects the point 904 and a point 907. A received power value corresponding to the point 907 is Pr1.

First, the TX transmits a digital ping to the RX in a light load state. The TX receives the received power value Pr1 received by the RX from the RX as a received power packet (mode 1). In this case, the RX does not supply the received power to the load (such as a charging circuit or a battery). The TX stores the received power value Pr1 and the transmitted power value Pt1 at that time in the memory. The coordinates of the point 900 are denoted as (Pt1, Pr1). The TX calculates the amount of power loss (denoted as Ploss1) between the TX and RX during power transmission at the transmitted power value Pt1. The relation of "Ploss1=Pt1−Pr1" is established.

Next, the TX receives the received power value Pr2 received by the RX in a connected load state from the RX as a received power packet (mode 2). In this case, the RX supplies the received power to the load (such as a charging circuit or a battery). The TX stores the received power value Pr2 and the transmitted power value Pt2 at that time in the memory. The coordinates of the point 901 are denoted as (Pt2, Pr2). The TX calculates the amount of power loss (denoted as Ploss2) between the TX and RX during power transmission at the transmitted power value Pt2. The relation of "Ploss2=Pt2−Pr2" is established.

The TX performs a linear interpolation process on the basis of the point 900 and the point 901 to generate the line segment 902. The line segment 902 indicates a relationship between transmitted power and received power in a state where there is no foreign object in the vicinity of the TX and RX. Thus, the TX can estimate the received power value in a state where it is highly probable that there is no foreign object from the transmitted power value and the line segment 902. For example, if the transmitted power value is Pt3, it can be estimated that the received power value is Pr3 from the point 903 on the line segment 902 corresponding to the transmitted power value Pt3.

If the TX transmits power to the RX at the transmitted power value Pt3, the TX is assumed to receive a received power value Pr3* from the RX. The TX subtracts the received power value Pr3* actually received from the RX from the received power value Pr3 in a state where there is no foreign object to calculate Pr3−Pr3* (=Ploss_FO). Ploss_FO can be considered as the amount of power loss that would have been dissipated in the foreign object if there is the foreign object between the TX and RX. Thus, if the amount of power loss Ploss_FO exceeds a threshold determined in advance, it can be determined that there is a foreign object (or it is highly probable that there is the foreign object). Alternatively, the TX obtains the amount of power loss Pt3−Pr3 (=Ploss3) between the TX and RX in advance from the received power value Pr3 in a state where there is no foreign object. Next, the TX obtains the amount of power loss Pt3−Pr3* (=Ploss3*) between the TX and RX in a state where there is a foreign object on the basis of the received power value Pr3* received from the RX in a state where there is a foreign object. Ploss_FO can be calculated from Ploss3*−Ploss3=Pt3−Pr3*−(Pt3−Pr3)=Pr3−Pr3* (=Ploss_FO).

As described above, a method of calculating the amount of power loss Ploss_FO due to a foreign object includes a method of calculation from Pr3−Pr3* and a method of calculation from Ploss3*−Ploss3.

After the line segment 902 is acquired, the TX periodically receives a signal related to a received power value (for example, Pr3*) from the RX. The received power value periodically transmitted by the RX is transmitted to the TX as a received power packet (mode 0). The TX can perform foreign object detection based on the power loss method using the received power value stored in the received power packet (mode 0) and the line segment 902.

The point 900 and the point 901 for acquiring the line segment 902 indicating the relationship between the transmitted power value and the received power value in a state where there is no foreign object in the vicinity of the TX and RX are referred to as a calibration data point (hereinafter denoted as CP). In addition, a line segment or curve acquired by interpolation of two or more CPs is referred to as a calibration curve.

Figure 6:
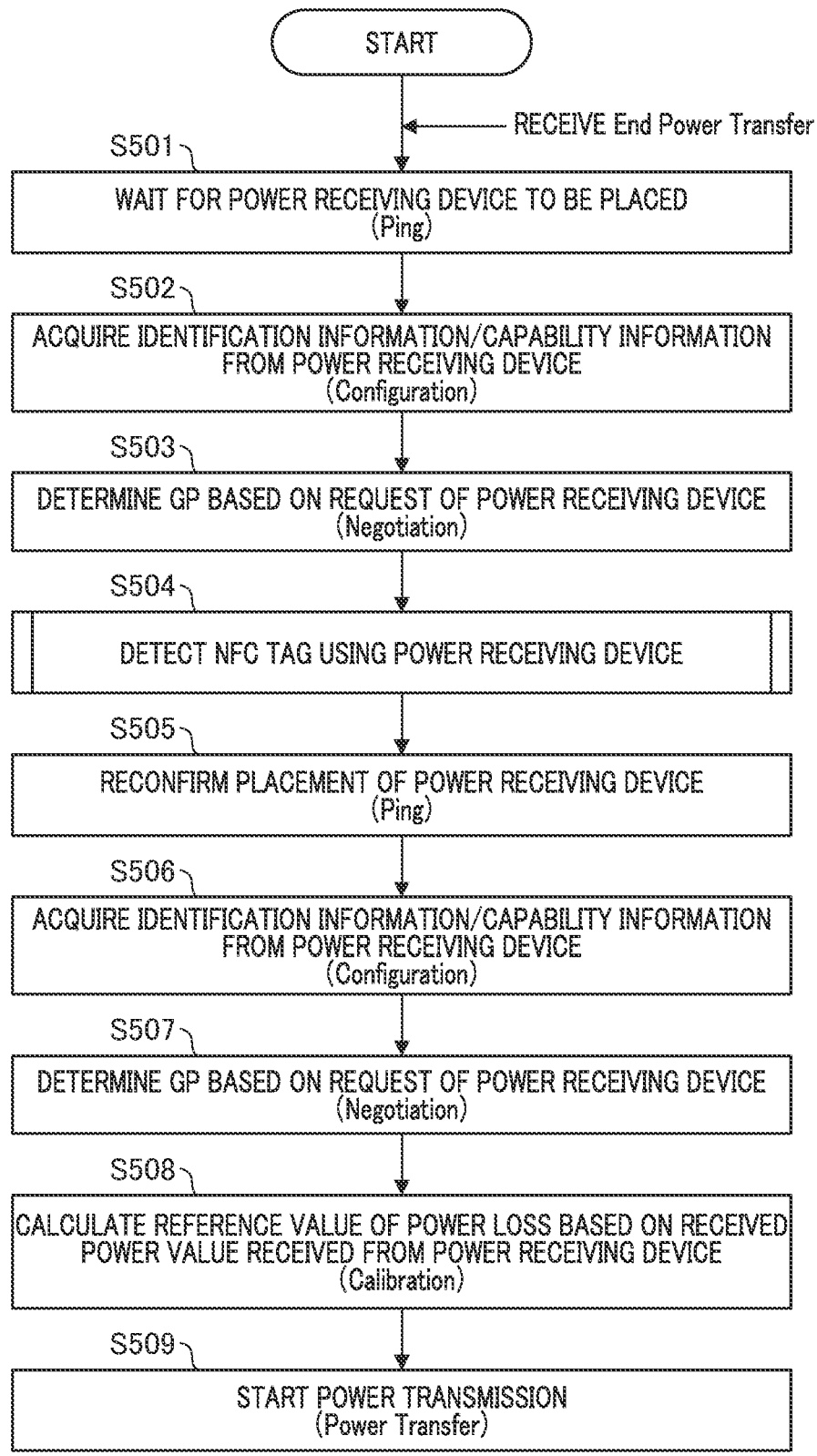
FIG. 6 is a flowchart of processing performed by a power transmission device according to one embodiment.

Next, an example of a flow of processing executed by the TX will be described with reference to FIG. 6. FIG. 6 is a flowchart illustrating an example of processing of the TX. This processing is realized, for example, by executing a program read out from the memory 205 by the control unit 201 of the TX. Meanwhile, some of the following processes may be realized by hardware. The hardware in this case uses, for example, a predetermined compiler to automatically generate a dedicated circuit using a gate array circuit such as an FPGA from a program for realizing each process step. In addition, this processing is executed in accordance with the power supply of the TX being turned on, a user of the TX inputting an instruction to start a non-contact charging application, or the TX being connected to a commercial power supply to receive power supply.

In S501, the TX executes processing specified as the ping phase of the WPC standard and waits for an object to be placed on the TX. In the ping phase, the TX repeatedly and intermittently transmits an analog ping of the WPC standard and executes a process of detecting an object which is present within the power transmittable range. At this time, the TX can transmit the analog ping sequentially from each power transmission coil, but there is no limitation thereto. For example, the analog ping may be transmitted simultaneously from a plurality of power transmission coil groups that do not interfere. In this case, the analog ping can be transmitted sequentially for each combination of a plurality of power transmission coil groups that do not interfere. If it is detected that there is an object within the power transmittable range, the TX transmits a digital ping of the WPC standard. Meanwhile, the digital ping can be transmitted from a power transmission coil that has detected that an object has been placed through the transmission of the analog ping. If there is a predetermined response to the digital ping, the TX determines that the detected object is the RX and that the RX is placed on the charging stand 103. At this time, the TX stores, in the memory, an identifier of the power transmission coil that has transmitted the digital ping as an identifier of the power transmission coil on which the RX is placed. The identifier has identification information for specifying a power transmission coil in the power transmission coil group. In addition, the TX stores, in the memory, a difference value between a Q value stored inside in advance in a state where there is no object (hereinafter referred to as an open Q value) and a Q value measured by transmitting the analog ping in S501. Alternatively, the measured Q value itself may be stored in the memory instead of the difference value.

If it is detected that the RX is placed in S501, the TX proceeds to the process of S502. In S502, the TX acquires identification information and capability information from the RX through communication in the configuration phase specified by the WPC standard. The identification information of the RX includes a manufacturer code and a basic device ID. The capability information of the RX includes the following information.

Information that can be used to specify the version of the WPC standard which is supported.

Maximum power value which is a value for specifying maximum power that the RX can supply to the load.

Information indicating whether a negotiation function of the WPC standard is provided.

However, the information is an example, and the identification information and capability information of the RX may be replaced with other information or may further include other information. For example, the identification information may be any other identification information that can identify an individual RX such as a wireless power ID. In addition, the TX may acquire the identification information and capability information of the RX using a method other than the communication in the configuration phase of the WPC standard. Next, the flow proceeds to the process of S503.

In S503, the TX executes negotiation with the RX through the communication in the negotiation phase specified by the WPC standard and determines the GP value. Alternatively, in S503, a process of determining the GP value is executed using a method other than the communication in the negotiation phase of the WPC standard. Alternatively, if the TX acquires information indicating that the RX does not correspond to the negotiation phase, for example, in S502, it does not perform the communication in the negotiation phase and determines the GP value as a predetermined value. The predetermined value is, for example, a value specified in advance by the WPC standard.

In the negotiation phase of S503, in addition to the process of determining the GP value, information relating to a temporary stop period for NFC tag detection performed by the RX may be exchanged between the RX and TX. For example, the RX determines a time equivalent to the length of the temporary stop period and notifies the TX of the time. The time information for the temporary stop period is included in, for example, a specific request packet and transmitted, but there is no limitation thereto. In addition, in a case where the TX receives a notification of the time information for the temporary stop period from the RX, the TX can transmit an acknowledgement ACK if this notification is received and transmit a negative acknowledgment NAK if this notification is rejected. If the NAK is received, the RX can change the time equivalent to the length of the temporary stop period and perform a notification again. After S503, the flow proceeds to the process of S504.

In S504, the TX executes processing during the NFC tag detection processing period of the power receiving device. This processing will be described later. Next, in S505, the TX re-executes the processing specified as the ping phase of the WPC standard, and reconfirms the placement of the RX. At that time, the TX may start from transmission of a digital ping without transmitting an analog ping. In addition, the digital ping can be transmitted from a power transmission coil that stores the placement of the RX in S501. The power transmission coil can be specified by an identifier stored in the memory. If the TX detects that the RX is placed, the process proceeds to S506.

In S506, the TX acquires the identification information and capability information from the RX through communication in the configuration phase specified by the WPC standard. Next, in S507, the TX executes negotiation with the RX through the communication in the negotiation phase specified by the WPC standard, and determines the GP value. In the next S508, the calibration phase is entered, and the TX calculates a reference value of power loss on the basis of the received power value of the RX. In the calibration phase, the TX derives the relationship between the transmitted power value and the received power value in a state where there is no foreign object as described using FIG. 5. The TX uses a predetermined received power value acquired from the RX to derive data indicating the power loss between the TX and RX in a state where there is no foreign object on the basis of the WPC standard. The predetermined received power value is a received power value in a light load state, a received power value in a connected load state, or the like. Data corresponding to the line segment 902 in FIG. 5 is acquired. In the foreign object detection process based on the power loss method, the amount of power loss between the TX and RX during power transmission is calculated on the basis of the calibration curve and the received power value of the RX received during power transmission. This amount of power loss is compared with a threshold, and if it is equal to or greater than the threshold, the TX determines that there is a "foreign object" or "a foreign object is likely to be present."

After S508, in S509, the TX starts power transmission to the RX. The power transmission is performed using processing in the power transfer phase. However, without being limited thereto, power transmission may be performed using a method other than the WPC standard. If it is determined that the RX is not placed on the TX, the TX returns the process to the ping phase of S501.

If end power transfer (hereinafter referred to as an EPT packet) of the WPC standard is received from the RX, the TX ends the processing in any processing phase in accordance with the WPC standard. The TX stops power transmission and then returns the processing to the ping phase of S501. Meanwhile, if the NFC tag is detected as a result of the NFC tag detection process in the RX, or if the battery is fully charged, the EPT packet is transmitted from the RX to the TX, and thus the process returns to the ping phase of S501.

Figure 7:
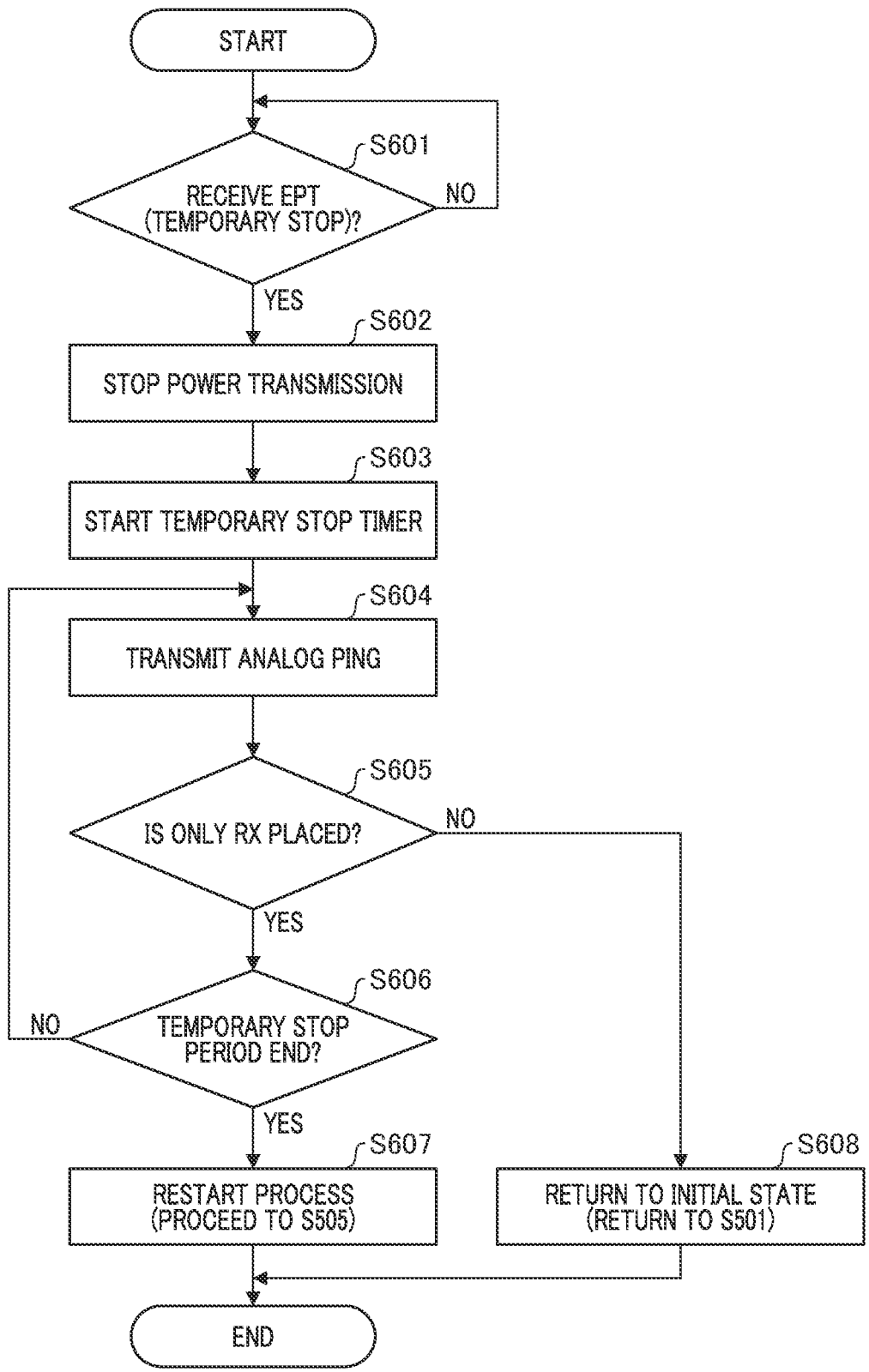
FIG. 7 is a flowchart of processing in an NFC tag detection processing period according to one embodiment.

The processing executed by the TX in S504 of FIG. 5 will be described with reference to FIG. 7. FIG. 7 is a flowchart illustrating a processing example in the NFC tag detection processing period. In S601, it is determined whether the stop request has been received, triggered by the start of processing. The TX determines whether the EPT packet requesting temporary stop of processing has been received from the RX. If it is determined that the EPT packet has been received from the RX (YES in S601), the process proceeds to S602. On the other hand, if it is determined that the EPT packet has not been received from the RX (NO in S601), the TX waits temporarily and then repeatedly executes the process of S601.

In S602, the TX stops the power transmission process in order for the RX to detect the NFC tag, and advances the process to S603. In S603, the TX causes the timer 310 to start a clocking process (temporary stop timer) of counting the length of the temporary stop period. The temporary stop period can be the time determined in the negotiation phase of S503 in FIG. 6, but there is no limitation thereto. For example, it may be a time selected from a range defined by the WPC standard, or a predetermined time (fixed time) stored in advance. After S603, the flow proceeds to the process of S604.

In S604, the TX transmits an analog ping. The analog ping can be transmitted from the power transmission coil in which the RX is stored as being placed in the ping phase of S501, but there is no limitation thereto. For example, it is possible to simultaneously transmit the analog pings from a plurality of power transmission coil groups that do not interfere, including the power transmission coil in which the RX is stored as being placed in the ping phase of S501. Naturally, control may be performed so that the analog ping is not transmitted from any power transmission coil other than the power transmission coil in which the RX is stored as being placed. After S604, the flow proceeds to the process of S605.

In S605, the TX determines whether only the RX is placed. The determination of S605 can be executed on the basis of physical quantities that can be measured by transmitting the analog ping. For example, the Q value is measured for each analog ping transmission, and the difference value between the Q value (measured value) and the open Q value is calculated. Whether the RX is placed is determined depending on whether the difference value is equal to or greater than a threshold. Alternatively, the determination may be performed using a difference between a reference Q value received from the RX in the ping phase of S501 and the measured Q value. Alternatively, the amount of change in the coupling coefficient between the power transmission coil and the power receiving coil may be measured, and the determination may be performed depending on whether the measured amount of change is equal to or greater than the threshold. Further, a method of measuring the amount of change in a voltage or current or a plurality of physical quantities described above, and making a determination on the basis of a plurality of measured values and thresholds may also be used. If it is determined in S605 that only the RX is placed, the flow proceeds to the process of S606, and if it is determined that not only the RX is placed, the flow proceeds to the process of S608.

In S606, the TX determines whether the temporary stop period has ended on the basis of the count value of the temporary stop timer. If the TX determines that the temporary stop period has ended (YES in S606), the flow proceeds to the process of S607, and if it determines that the temporary stop period has not ended (NO in S606), the flow proceeds to the process of S604. In order to restart the process in S607, the flow proceeds to the process of the ping phase of S505 in FIG. 6. In addition, in S608, the process proceeds to the ping phase of S501 which is an initial state without waiting for the end of the temporary stop period. After S607 and S608, the process in the NFC tag detection processing period ends.

Next, a processing example executed in the present embodiment will be described. Some examples of operating sequences for executing the above-described processes are shown below. As an initial state, the RX is not placed on the TX. The TX is assumed to have sufficient power transmission capability to be able to execute power transmission at GP requested by the RX. In addition, an example in which the RX is placed on the power transmission coil 403 in FIG. 4 will be described, but a user can place the RX on a desired power transmission coil.

First Processing Example

In the present processing example, an analog ping is transmitted sequentially from each power transmission coil as an initial state, and the TX detects that the RX has been placed. Next, if negotiation is completed, the TX stops power transmission in order to execute the NFC tag detection process performed by the RX and starts to transmit an analog ping with only the power transmission coil in which the RX is placed. Thereafter, the RX is removed before the temporary stop period elapses. The TX determines that not only the RX is placed, immediately returns to the initial state, and restarts to transmit the analog ping sequentially from each power transmission coil.

Figure 8:
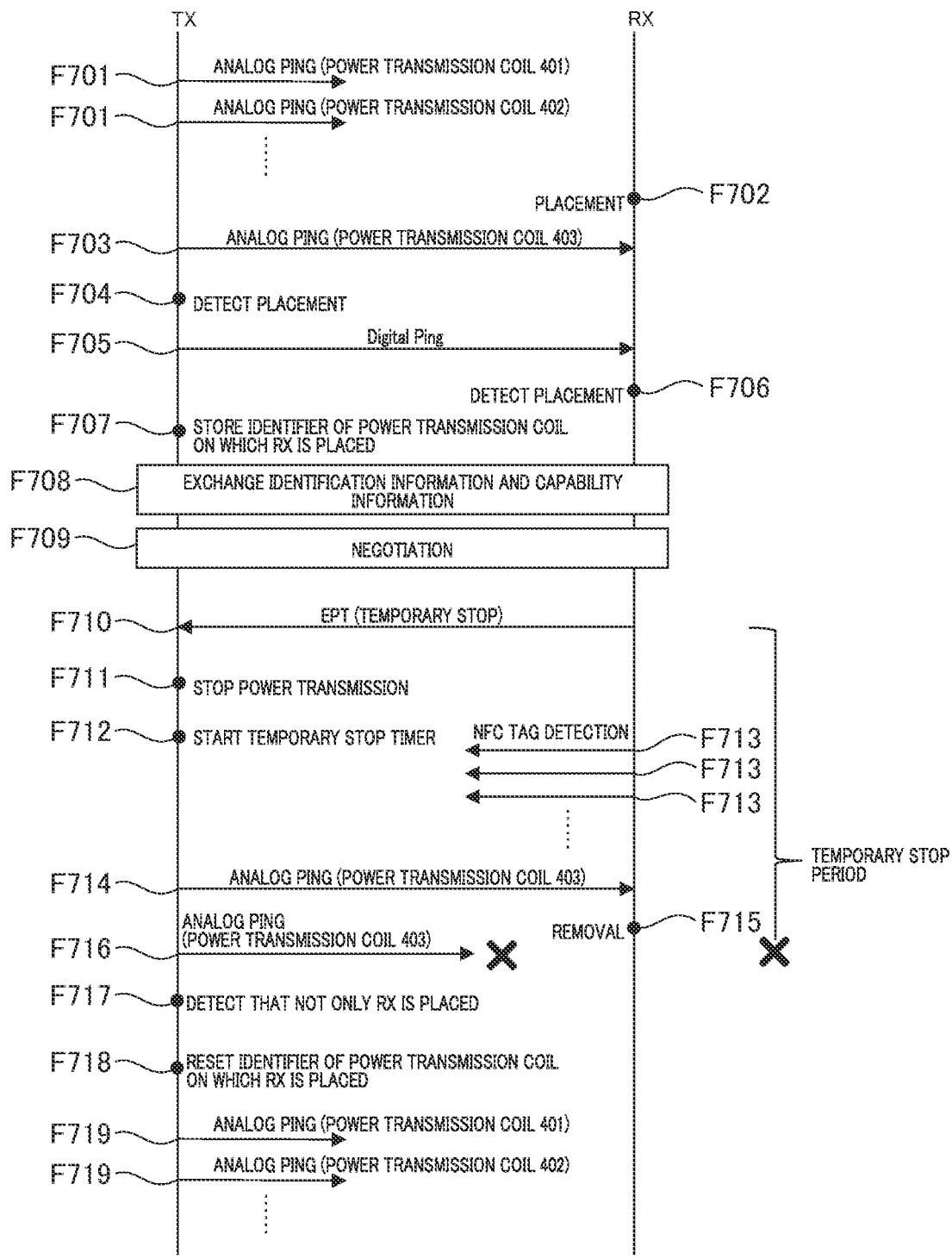
FIG. 8 is an operation sequence diagram of a first processing example.

FIG. 8 shows an operating sequence in a first processing example. In F701, the TX transmits an analog ping sequentially from the power transmission coils 401, 402, . . . and waits for an object to be placed (see S501 in FIG. 6). The RX is placed on the TX in F702, and a change occurs in the analog ping in F703. Thereby, the TX detects that an object is placed on the power transmission coil 403 in F704.

Next, the TX transmits a digital ping in F705, and the RX detects that its host device is placed on the TX in F706. On the other hand, the TX detects that the placed object is the RX from the response of the digital ping. In F707, the TX stores the identifier of the power transmission coil 403 on which the RX is placed in the memory. Next, in F708, the TX acquires the identification information and capability information from the RX through the communication in the configuration phase (see S502 of FIG. 6).

In F709, the TX and RX execute the communication in the negotiation phase (see S503 of FIG. 6). For example, it is assumed that the GP value is determined to be 5 (watts) and the length of the temporary stop period is determined to be 10 seconds through negotiation based on communication. The RX transmits a request to stop power transmission (EPT packet) to the TX. In F710, the TX receives the EPT packet from the RX (YES in S601 of FIG. 7). In F711, the TX stops power transmission (see S602 of FIG. 7), and in F712, it starts operating the temporary stop timer that counts a time equivalent to the length of the temporary stop period (see S603 of FIG. 7).

During the temporary stop period, the RX performs NFC tag detection in F713. On the other hand, in F714, the TX transmits the analog ping only from the power transmission coil 403 on which the RX is placed (see S604 of FIG. 7). At this point in time, the RX is placed on the power transmission coil 403 (YES in S605), and the temporary stop period (10 seconds) has not elapsed (NO in S606). Thus, the transmission of the analog ping from the power transmission coil 403 continues. Thereafter, if the RX is removed from the TX in F715, the change that has occurred in the analog ping in the TX disappears in F716 (a change in physical quantity occurs). In F717, the TX detects that not only the RX is placed (NO in S605). Next, in F718, the TX resets the identifier of the power transmission coil 403 stored as the power transmission coil on which the RX is placed, and returns the process to the initial state without waiting for the end of the temporary stop period (see S608 of FIG. 7). In F719, the TX transmits the analog ping sequentially from each power transmission coil (see S501 in FIG. 6).

In the first processing example, the TX transmits the analog ping only from the power transmission coil in which the state of placement of the RX is detected during the temporary stop period. This makes it possible to detect the state of placement of the RX with a high degree of accuracy even during the temporary stop period, and to realize a safer and more efficient wireless power transmission system. In addition, if the RX is removed during the temporary stop period, the TX returns to the initial state without waiting for the end of the temporary stop period and transmits the analog ping sequentially from each power transmission coil. This makes it possible for the TX to immediately start a process for performing power transmission if a new RX is placed, and possible to realize a more efficient wireless power transmission system.

Second Processing Example

In the present processing example, the analog ping is transmitted sequentially from each power transmission coil as an initial state, and the TX detects that the RX has been placed. Next, if negotiation is completed, the TX stops the power transmission in order to execute the NFC tag detection process performed by the power receiving device, and transmits the analog ping only from the power transmission coil on which the RX is placed. Thereafter, the temporary stop period ends, and the TX restarts the power transmission process.

Figure 9:
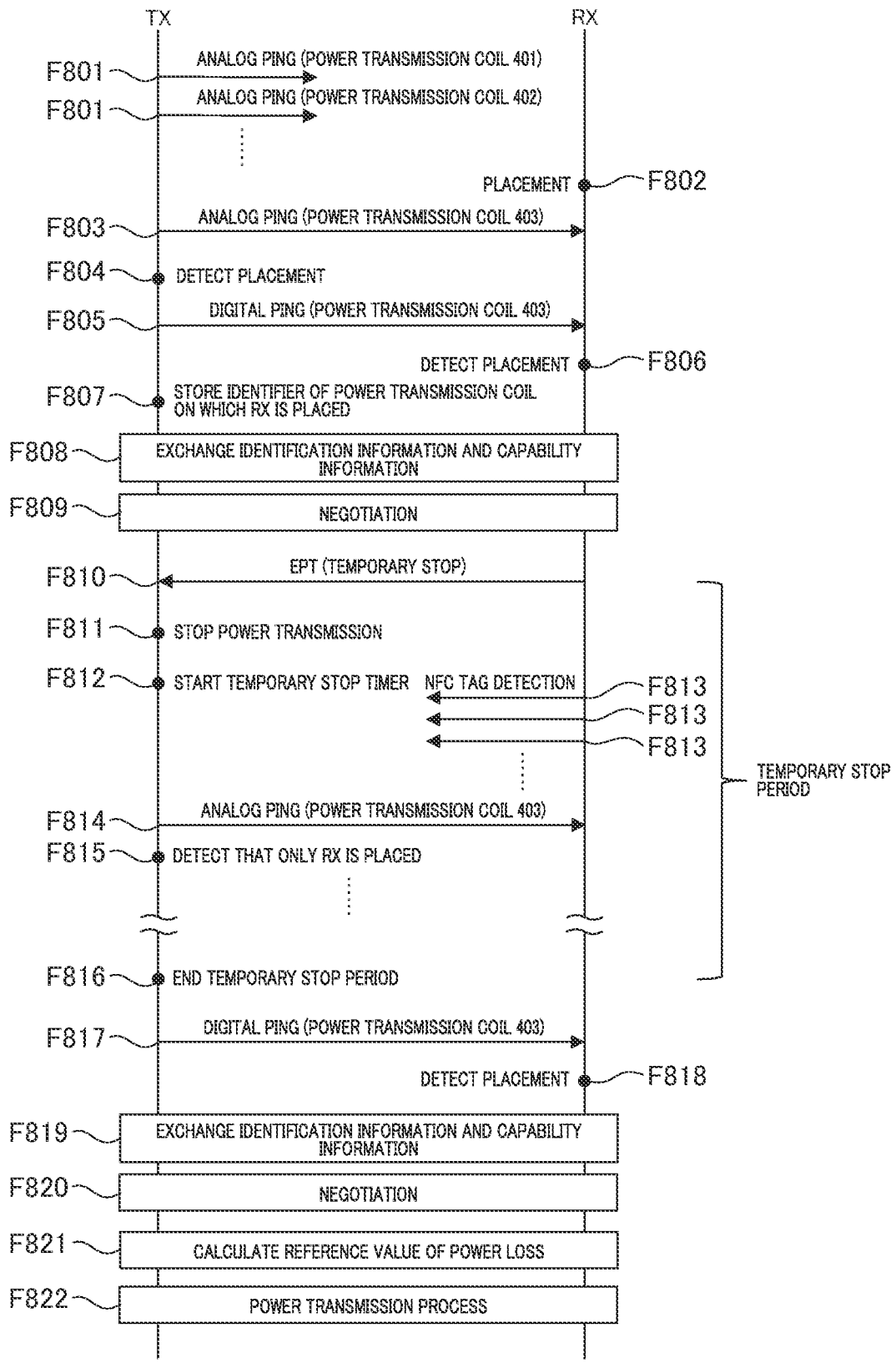
FIG. 9 is an operation sequence diagram of a second processing example according to one embodiment.

FIG. 9 shows an operating sequence in a second processing example. Since F801 to F814 are the same as F701 to F714 in FIG. 8, respectively, description thereof will be omitted and differences therebetween will be described. In F815, there is a change in the analog ping transmitted in F814 (no change in physical quantity), and thus the TX detects that only the RX is placed (YES in S605 of FIG. 7). Thereafter, if temporary stop period has elapsed, in F816, the TX ends the process in the temporary stop period for the NFC tag detection process performed by the RX (YES in S606 of FIG. 7).

In F817, the TX transmits the digital ping from the power transmission coil 403 on which the RX is placed. In F818, the RX detects that its host device has been placed on the TX through the digital ping. In F819, the TX detects again that the placed object is the RX from the response of the digital ping, and acquires the identification information and capability information from the RX through the communication in the configuration phase (see S506 of FIG. 6).

Next, in F820, the TX and RX execute the communication in the negotiation phase (see S507 of FIG. 6). For example, it is assumed that the GP value is determined to be 15 (watts). In F821, the TX calculates and generates a calibration curve through the communication in the calibration phase, and calculates the reference value of power loss (see S508 of FIG. 6). In F822, the TX starts processing of power transmission to the RX (see S509 of FIG. 6).

In the second processing example, if the RX is not removed during the temporary stop period, the TX transmits the digital ping from the power transmission coil in which the state of placement of the RX is detected after the end of the temporary stop period. This makes it possible to rapidly restart the process for performing power transmission and reception, and to realize a more efficient wireless power transmission system.

Other Processing Examples

The TX of the present embodiment transmits the analog ping during the temporary stop period and determines whether only the RX is placed. Without being limited to this determination, the following state determination can be performed if not only the RX is placed.
(A) Determination of whether being in a first state where no object is placed.
(B) Determination of whether being in a second state where another object (such as a foreign object) other than the RX is placed.

First, the determination of the above (A) will be described. In determining whether being in the first state, a difference value between the open Q value and the measured Q value is calculated, and the difference value is compared with a first threshold. If the difference value is less than the first threshold, it can be determined that no object is placed. Meanwhile, since the open Q value is a Q value in a state where no object is placed, the first threshold is set to zero or a value close to zero.

In the above (B), in determining whether being in the second state, a process of comparing the difference value of the Q value in a state where only the RX is placed which is stored in S501 of FIG. 6 with the difference value between the open Q value and the measured Q value is performed. If the difference value which is a result of comparison is equal to or greater than a second threshold, it can be determined that an object other than the RX is placed.

In the present embodiment, if the TX determines that not only the RX is placed, it ends the process without waiting for the temporary stop period to elapse, returns to the initial state, and transmits the analog ping sequentially from each power transmission coil. Without being limited to this operating sequence, it is possible to execute a process according to the state determined by the above (A) or (B). For example, in (B), if the TX determines, as the second state, that there is a possibility of an object (foreign object) other than the RX being placed, it ends the processing without waiting for the temporary stop period to elapse, returns to the initial state, and does not transmit the analog ping. If there is a possibility of a foreign object being placed, this makes it possible to stop power transmission more reliably, and to realize a safer and more efficient wireless power transmission system.

In addition, as another state, it is possible to determine whether there is a third state in which the position of placement of the RX is displaced from the TX. In this determination, a third threshold is set in addition to the second threshold. The relation of "third threshold<second threshold" is assumed to be established. If the difference value which is a result of comparison is less than the second threshold and equal to or greater than the third threshold, it can be determined to be the third state. In this case, the TX can transmit the analog ping from a power transmission coil near the power transmission coil on which the RX is placed (hereinafter referred to as a nearby coil) which is stored in S501 of FIG. 6 without ending the temporary stop period. At this time, the TX compares the difference value between the Q value measured by transmitting the analog ping and the open Q value with the difference value stored in S501. If the difference value which is a result of comparison is less than the threshold, the TX can determine that the RX is placed on the nearby coil (the position of placement of the RX has changed) and continue the temporary stop period. Since unnecessary processing is not performed and transition to the initial state can be suppressed, it is possible to realize a more efficient wireless power transmission system. Meanwhile, when the TX determines that the RX is placed on a nearby coil, it may continue to transmit a digital ping from the nearby coil and determine whether it is the RX depending on the presence or absence of a response. In addition, the TX can determine whether it is the same RX as the RX which has been placed before the start of the temporary stop period on the basis of the information included in the response of the digital ping. It is possible to determine whether the same RX is placed on the TX with a high degree of accuracy.

The method of determining the state of placement of the RX using the Q value is an example, and a determination method using a physical quantity that can be measured by transmitting an analog ping, a determination method using communication of the WPC standard such as a digital ping, or the like may be used.

During the temporary stop period, the TX transmits the analog ping only from a specific power transmission coil on which the RX is placed which is stored in S501 of FIG. 6, but there is no limitation thereto, and the TX may transmit the analog ping from a plurality of power transmission coil groups that do not interfere, including the specific power transmission coil. This makes it possible to make a determination regarding the second state or the third state on the basis of a single transmission of analog ping. In addition, a plurality of power transmission coil groups that do not include the specific power transmission coil may be used. In this case, the TX can transmit the analog ping sequentially for each combination of a plurality of power transmission coil groups including the specific power transmission coil and a power transmission coil group not including the specific power transmission coil. The transmission interval of the analog ping at this time is set to a shorter interval than the transmission interval of the analog ping in the initial state (S501). This makes it possible for the TX to detect the state of placement of an object over the entire power transmittable range of the TX while detecting the state of placement of the RX even during the temporary stop period.

In the present embodiment, the TX performs a process of storing the identifier of the specific power transmission coil and the difference value between the open Q value and the Q value in a state where the RX is placed in the memory in the ping phase (S501 of FIG. 6). It is also possible to perform this storage process at a different timing. For example, the storage process may be performed in the configuration phase or the negotiation phase. In addition, a process of storing each piece of information at different timings may be performed. At this time, the TX may perform the foreign object detection process and then perform the storage process only if it determines that there is no foreign object. This makes it possible for the TX to determine that only the RX is placed with a higher degree of accuracy and then start the temporary stop process, and to realize a safer and more efficient wireless power transmission system.

The stop period referred to in the present disclosure is not limited to the period for performing the NFC tag detection process performed by the power receiving device, and the stop period may be used for another purpose. For example, if the temperature of the device rises during power transmission and reception, it may be a temporary stop period for lowering the temperature. In this case, the TX processing described in the present embodiment can be applied in the same way as the period for performing the NFC tag detection process performed by the power receiving device. It is possible to detect the state of placement of the RX more accurately even during the stop period that differs depending on the purpose, and to realize a safer and more efficient wireless power transmission system.

In the present embodiment, the TX can transmit power to a maximum of one RX, but the TX may be able to transmit power to a plurality of RXs. In this case, the TX includes a plurality of power transmission circuits or communication units, and can transmit power to each RX using power transmission coils that do not interfere with each other. In the embodiment in which power can be transmitted to a plurality of RXs, the TX processing described in the present embodiment can be applied during the temporary stop period corresponding to each RX.

In the related art, there is a possibility that the power receiving device cannot be detected depending on a timing when the power receiving device is removed during the period of stop of power transmission and reception, or the like. According to the embodiment of the present disclosure, it is possible to provide an appropriate control technique for detecting the state of placement of an object during the period of stop of power transmission and reception in the power transmission device including a plurality of power transmission coils.

Other Embodiments

The present disclosure can also be realized by processing of supplying a program for realizing one or more functions of the above-described embodiment to a system or device through a network or a storage medium, and reading and executing the program by one or more processors in a computer of the system or device. In addition, it can also be realized by a circuit (for example, ASIC) that realizes one or more functions.

In addition, the power transmission device 101 and the power receiving device 102 may be, for example, an imaging device (such as a still camera or a video camera) or an image input device such as a scanner, or may be an image output device such as a printer, a copier, or a projector. In addition, it may be a storage device such as a hard disk device or a memory device, or may be an information processing device such as a personal computer (PC) or a smartphone.

In addition, the power receiving device of various embodiments of the present disclosure may be an information terminal instrument. For example, the information terminal instrument has a display unit (display) that displays information to a user, which is supplied with power received from a power receiving antenna. Meanwhile, the power received from the power receiving antenna is stored in a power storage unit (battery), and power is supplied from the battery to the display unit. In this case, the power receiving device may have a communication unit that communicates with other devices different from the power transmission device. The communication unit may support communication standards such as NFC communication and the fifth generation mobile communication system (5G).

In addition, the power receiving device of various embodiments of the present disclosure may be a vehicle such as an automobile. For example, an automobile which is a power receiving device may receive power from a charger (power transmission device) through a power transmission antenna installed in a parking lot. In addition, an automobile which is a power receiving device may receive power from a charger (power transmission device) through a power transmission antenna embedded in a road. The received power is supplied to the battery of an automobile. The power of the battery may be supplied to a driving unit (motor, electromotive unit) that drives the wheels, or may be used to drive a sensor used for driving assistance or to drive a communication unit that communicates with an external device. That is, in this case, the power receiving device may have the wheels as well as a battery, or a motor or sensor driven using the received power, and a communication unit that communicates with devices other than the power transmission device. Further, the power receiving device may have an accommodation unit that accommodates a person. Examples of sensors include sensors used to measure a distance between vehicles or a distance to other obstacles, and the like. The communication unit may be compatible with, for example, the Global Positioning System (Global Positioning Satellite, GPS). In addition, the communication unit may be compatible with communication standards such as the fifth generation mobile communication system (5G). In addition, the vehicle may be a bicycle or a two-wheeled motor vehicle.

In addition, the power receiving device of various embodiments of the present disclosure may be an electric tool, a home appliance, or the like. These instruments which are power receiving devices may have a battery as well as a motor driven by received power stored in the battery. In addition, these instruments may have a notification unit that notifies the remaining amount of the battery and the like. In addition, these instruments may have a communication unit that communicates with other devices different from the power transmission device. The communication unit may be compatible with communication standards such as NFC and the fifth generation mobile communication system (5G).

In addition, the power transmission device of various embodiments of the present disclosure may be an in-vehicle charger that transmits power to portable information terminal instruments such as smartphones and tablets that support wireless power transmission in a vehicle which is an automobile. Such an in-vehicle charger may be provided anywhere in an automobile. For example, the in-vehicle charger may be installed in the console of an automobile, or may be installed in the instrument panel (dashboard), at a location between passenger seats, on the ceiling, or on the door. However, it should not be installed at a location that would interfere with driving. In addition, although the power transmission device has been described as an example of an in-vehicle charger, such a charger is not limited to being disposed in a vehicle, and may be installed in transport vehicles such as a train, an airplane, or a ship. The charger in this case may also be installed between passenger seats, on the ceiling, or on the door.

In addition, a vehicle such as an automobile equipped with an in-vehicle charger may be a power transmission device. In this case, the power transmission device has wheels and a battery, and uses power of the battery to supply power to the power receiving device through a power transmission circuit unit or a power transmission antenna.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-095053, filed Jun. 13, 2022, which is hereby incorporated by reference wherein in its entirety.

What is claimed is:

1. A power transmission device comprising:
a plurality of power transmission coils;
one or more processors configured to:
    wirelessly transmit power to a power receiving device using at least one of the plurality of power transmission coils;
    receive a request to stop power transmission from the power receiving device;
    negotiate a period of stop of power transmission with the power receiving device in a negotiation phase; and
    perform a process of detecting an object using a first power transmission coil which was used for the power transmission and a second power transmission coil that does not interfere with the first power transmission coil, in the period of stop of the power transmission which is negotiated with the power receiving device and in which the power transmission is stopped after the negotiation.

2. The power transmission device according to claim 1, the one or more processors are configured to determine a stop period in a case where the request is received.

3. The power transmission device according to claim 1, the one or more processors are configured to determine a state in which the power receiving device is placed on the power transmission coil, a state in which an object different from the power receiving device is placed thereon, or a state in which the object is not placed thereon.

4. The power transmission device according to claim 2, wherein the one or more processors perform control to end the process in the period of stop of the power transmission before the stop period elapses in a case where it is determined that the power receiving device is not placed on the power transmission coil.

5. The power transmission device according to claim 3, wherein the one or more processors determine the state depending on a change in a quality factor related to the power transmission coil, a difference between transmitted power of the power transmission device and received power of the power receiving device, or an amount of change in a coupling coefficient between the power transmission coil and a power receiving coil provided in the power receiving device.

6. The power transmission device according to claim 2, wherein, in a case where it is determined that the object different from the power receiving device is placed on the power transmission coil, the one or more processors perform control to end the process in the period of stop of the power transmission.

7. The power transmission device according to claim 2, wherein, in a case where a position of placement of the power receiving device is displaced from the power transmission device, the one or more processors perform the process by transmitting an analog ping from a second power transmission coil in the vicinity of a first power transmission coil corresponding to an identification information stored in a storage device.

8. The power transmission device according to claim 7, wherein, in a case where it is determined that the power receiving device is placed on the second power transmission coil, the one or more processors transmit a digital ping from the second power transmission coil and determines whether the power receiving device is a power receiving device detected before start of the stop period.

9. The power transmission device according to claim 2, wherein, after the stop period has elapsed, the one or more processors perform the process using the power transmission coil used for power transmission to the power receiving device.

10. The power transmission device according to claim 2, wherein the one or more processors perform the process using an analog ping during the stop period.

11. The power transmission device according to claim 1, wherein the one or more processors are configured to stop the power transmission to the power receiving device in a case where the request is received.

12. The power transmission device according to claim 1, further comprising wheels and a battery,
wherein the power transmission coil wirelessly transmits power to the power receiving device using power of the battery.

13. The power transmission device according to claim 1, wherein the device is installed in a vehicle.

14. The power transmission device according to claim 2, the one or more processors perform, in the period of stop of the power transmission, the process using the only power transmission coil which was used for the power transmission.

15. The power transmission device according to claim 1, wherein in the period of stop of the power transmission, NFC tag detection is performed by the power receiving device.

16. A method for power transmission of a power transmission device comprising a plurality of power transmission coils, the method comprising:
    wirelessly transmitting power to a power receiving device using at least one of the plurality of power transmission coils;
    receiving a request to stop power transmission from the power receiving device;
    negotiating a period of stop of power transmission with the power receiving device in a negotiation phase; and
    performing a process of detecting an object using a first power transmission coil which was used for the power transmission and a second power transmission coil that does not interfere with the first power transmission coil, in the period of stop of the power transmission which is negotiated with the power receiving device and in which the power transmission is stopped after the negotiation.

17. A non-transitory computer-readable storage medium storing a program for causing a computer to execute a method for power transmission of a power transmission device comprising a plurality of power transmission coils, the method comprising:
- wirelessly transmitting power to a power receiving device using at least one of the plurality of power transmission coils;
- receiving a request to stop power transmission from the power receiving device;
- negotiating a period of stop of power transmission with the power receiving device in a negotiation phase; and
- performing a process of detecting an object using a first power transmission coil which was used for the power transmission and a second power transmission coil that does not interfere with the first power transmission coil, in the period of stop of the power transmission which is negotiated with the power receiving device and in which the power transmission is stopped after the negotiation.

* * * * *